United States Patent [19]

Alexander, Sr.

[11] Patent Number: 4,954,148

[45] Date of Patent: Sep. 4, 1990

[54] APPARATUS FOR TREATING GAS

[75] Inventor: Jack L. Alexander, Sr., Danville, Va.

[73] Assignee: Rockwell International Corporation, El Segundo, Calif.

[21] Appl. No.: 270,453

[22] Filed: Nov. 7, 1988

Related U.S. Application Data

[63] Continuation of Ser. No. 111,637, Oct. 23, 1987, abandoned.

[51] Int. Cl.$^5$ .............................................. B01D 47/12
[52] U.S. Cl. ..................................... 55/223; 55/257.2; 55/440
[58] Field of Search ................ 55/223, 440, 257 PV, 55/186, 467, 94

[56] References Cited

U.S. PATENT DOCUMENTS

| | | | |
|---|---|---|---|
| 3,413,778 | 12/1968 | Alexander | 55/186 |
| 3,444,670 | 5/1969 | Hungate | 55/257 |
| 3,527,030 | 9/1970 | Hungate | 55/440 |
| 3,690,044 | 9/1972 | Boresta | 55/223 |
| 3,726,062 | 4/1973 | Hungate et al. | 55/89 |
| 3,733,778 | 5/1973 | Hungate et al. | 55/89 |
| 3,849,095 | 11/1974 | Regehr | 55/440 X |
| 3,912,471 | 10/1975 | Cotton | 55/440 |
| 3,950,156 | 4/1976 | Kall | 55/440 |
| 4,157,250 | 6/1979 | Regehr et al. | 55/257 PV X |
| 4,164,399 | 8/1979 | Kannapell | 55/223 |
| 4,533,367 | 8/1985 | Hadzismajlovic | 55/223 X |

OTHER PUBLICATIONS

"Original Hungate High Velocity Eliminator Blade Plan and Details", cited by the applicant in paper No. 11.

Primary Examiner—Charles Hart
Attorney, Agent, or Firm—H. Fredrick Hamann; Harry B. Field

[57] ABSTRACT

An apparatus for treating a gas stream with a liquid includes a housing containing an eliminator section for removing liquid from the gas and, adjacent to and upstream of the eliminator section with respect to the gas flow, vertical angle liquid collectors mounted on side walls of the housing to remove from the gas stream large amounts of liquid which flow along the side walls. A plate member depends from a top wall of the housing and another plate member extends up from adjacent the bottom wall of the housing to deflect toward a central portion of the eliminator liquid-laden portions of the gas stream which travel along the top and bottom walls. Baffles upstream of the eliminator are adjustable to control the flow of gas through the apparatus. The eliminator includes a plurality of sawtooth blades defining zigzag paths for the gas, each blade including a plurality of planar members each having at least one vertical groove adjacent its trailing end to remove liquid from the gas and permit it to drain. Each blade member terminates in a tail portion, parallel to the gas flow, defining additional drainage grooves.

12 Claims, 4 Drawing Sheets

APPARATUS FOR TREATING GAS

This application is a continuation of application Ser. No. 111,637, filed Oct. 23, 1987, abandoned.

BACKGROUND OF THE INVENTION

This invention relates to an apparatus for treating gas and more particularly to an apparatus for treating gas by placing it in intimate contact with a liquid. More specifically, the present invention is directed to an apparatus for treating air with a liquid, such as water, said apparatus being of the type generally used in air conditioning and air washing systems. In these systems an air stream is passed through a housing into direct contact with water by discharging the water into the air stream as it moves through the apparatus.

At one time, apparatus for treating air with water as generally used in industrial applications was severely restricted in operating velocities due to the configuration of the eliminators employed in the apparatus. Eliminators are normally used to remove entrained water particles from the air stream before the air stream is discharged from the apparatus. These eliminators usually consisted of a plurality of stationary blades having a general saw-tooth cross-section which define zigzag paths through the eliminators. The path configuration is intended to result in the impingement of the liquid particles on the blades where the liquid is collected and drained. Generally, these eliminators are effective up to a predetermined velocity at which point the liquid droplets in the air stream tend to pass through the eliminator construction. One of the reasons for this passage of liquid through the eliminator construction is the splattering or impinging of the water droplets on the blade surfaces in such a manner that the liquid passes back into the air stream and continues with the air stream out of the apparatus.

In order to ameliorate the situation, the tendency was to extend the zigzag path by adding more stages so that eventually all the water droplets were removed. Unfortunately, when this expedient was utilized, the pressure drop through the unit was increased, thereby requiring larger fans to be used to pump the air. Naturally, the acceptable pressure drop through the eliminator and the consequent fan size have an upper limit which is easily reached and as a result this approach was not truly a solution but was only an expedient.

U.S. Pat. No. 3,444,670 of Ernest C. Hungate discloses an improved eliminator structure, in which an impingement device including vertically extending wall portions angularly disposed with respect to the gas stream is positioned upstream of a plurality of substantially vertical wall members defining zigzag paths. The trailing ends of the wall portions of the impingement device have tab portions which define vertically extending channels which collect the liquid hitting the wall portions and allow it to drain to the bottom of the housing. The vertical wall members are covered with a resilient foam material, such as urethane, which contains a large number of small openings and a plurality of passages. The fine liquid particles which reach the vertical wall members penetrate the surface of the foam and drain freely while sheltered to a great extent from the air stream.

Although there are improvements in performance of the apparatus of U.S. Pat. No. 3,444,670, two sets of wall members are required, thereby increasing manufacturing time and costs. In addition, the foam material increases the manufacturing costs, as does the operation of coating the wall members. Furthermore, provisions are required to protect the foam from the gas stream, such as clips attached to the leading edges of the vertical wall members.

U.S. Pat. No. 3,527,030 of Ernest C. Hungate discloses a further improvement in the eliminator structure, in that impingement surfaces are incorporated in the leading ends of the substantially vertical wall members defining zigzag paths. The impingement surfaces include substantially vertically extending grooves having an offset portion and a fluid stream reversal portion so that the direction of the gas flow and the direction of flow of the liquid removed from the gas stream are substantially in confronting arrangement, thereby permitting the liquid to drain down the groove. However, this further improvement did not eliminate the need for coating portions of the wall members with foam and the provisions for protecting the foam from the gas stream.

Despite the fact that the devices disclosed in the patents mentioned above represent significant improvements in the art, they do not directly address the problems resulting from the fact that large quantities of the liquid in the gas stream flow along the walls of the housing and can, under certain conditions, overload the portions of the eliminator adjacent to the housing walls. When an overload occurs, significant amounts of liquid are not removed by the eliminator and are free to remain in the gas stream when it exits the housing. In addition, none of the known gas treatment apparatuses includes a simple structure for controlling the flow of gas.

SUMMARY OF THE INVENTION

The chief object of the present invention is to provide an improved gas-treating apparatus.

A further object of the invention is to provide a gas-treating apparatus which removes large amounts of liquid from the gas stream upstream of the eliminator.

A still further object of the invention is to provide an improved eliminator construction capable of operating at high gas velocities while effectively removing liquid particles from the gas stream.

These and other objects of the invention will be more readily perceived from the following description.

The present invention is directed to an apparatus for treating a gas stream with a liquid, such as an air washer which treats an air stream with water. The apparatus includes a housing having a passage therein with an inlet and an outlet and may include a fan for moving the air stream through the passage. The apparatus further includes an eliminator comprising a plurality of substantially vertical wall members each having an integral impingement panel for removing most of the liquid from the gas stream and a plurality of planar members angularly disposed with respect to the air flow and to one another to define a zigzag path for the air. The impingement panels have grooves for causing the gas and liquid streams flowing along the impingement panels to confront one another so that flow components of the gas and liquid are nullified, allowing the liquid to drain down the grooves. The planar members have grooves, differing in configuration from the grooves of the impingement panels, for allowing smaller amounts of liquid to drain. Vertical liquid collector blades are mounted on the interior surface of the housing just upstream of the eliminator to collect and remove the large amounts of liquid flowing along the housing sides and to cause the liquid to drain before it enters the eliminator, thereby greatly reducing any likelihood that the liquid will overload the peripheral portions of the eliminator.

Also operating to prevent overloading of the peripheral portions of eliminator are a liquid diverter plate which depends from the top of the housing into the gas stream to deflect the liquid-laden gas near the top of the housing toward the center of the eliminator and an inverted weir member which deflects the liquidladen gas near the bottom of the housing toward the center of the eliminator. The flow of gas through the apparatus can be controlled by adjustable baffles mounted in the housing upstream of the spray section. The baffles include two rows of vertical angle members pointing upstream in the housing, with angle members of one row being aligned with spaces between the angle members of the other row. The angle members of one row are mounted for movement relative to the other row to increase or decrease the spaces between the angle members of one row and the angle members of the other row to accordingly increase or decrease the gas flow through the apparatus.

Although the gas treatment apparatus to which the present invention pertains has been particularly described as involving the treatment of air with water in air conditioning systems, such gas treatment apparatus can also be used in other processes, such as to control the emissions of odors and particulate matter, for example, in air from a rendering and meat packing operation by spraying into the air one or more chemical solutions, as is disclosed in U.S. Pat. No. 3,726,062 of Ernest C. Hungate et al, including a solution of sodium carbonate in water, as is disclosed in U.S. Pat. No. 3,733,778 of Ernest C. Hungate et al.

DETAILED DESCRIPTION OF THE PREFERRED EMBODIMENTS

Figure 1:
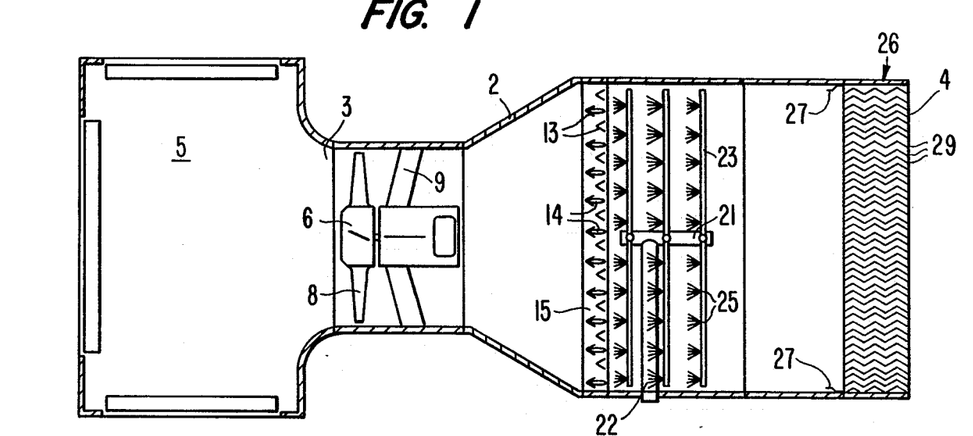
FIG. 1 is a sectional view in plan of an apparatus employing the invention.
Figure 2:
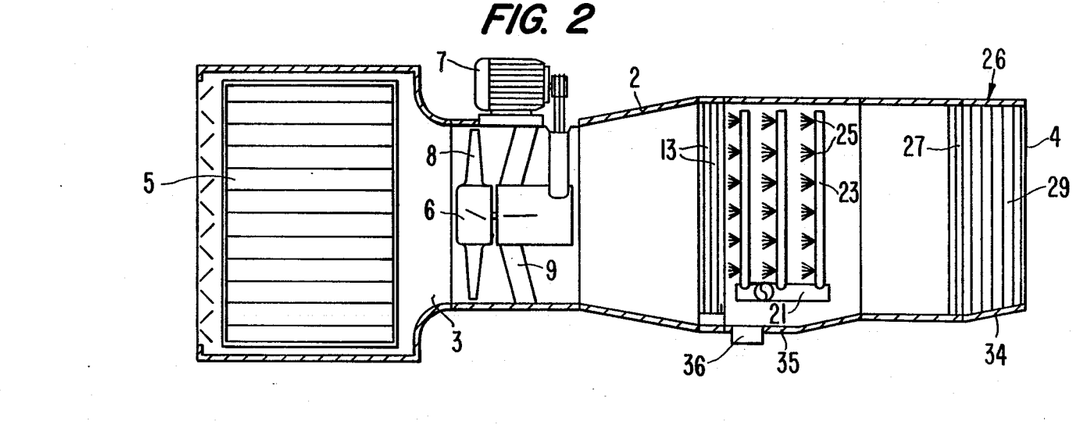
FIG. 2 is a sectional view in elevation of the apparatus shown in FIG. 1.

Referring to the drawings, there is shown in FIGS. 1 and 2 apparatus embodying the present invention for treating an air or a gas stream. This apparatus includes a housing 2 having an inlet 3 and an outlet 4. The inlet 3 and the outlet 4 are connected by a passage defined by the housing. In an air washer as used in a textile mill, the inlet 3 is usually connected to a mixing chamber 5. Usually this mixing chamber 5 has an adjusting apparatus therein to predetermine the amount of outside air and return air which are to be introduced into the air washer.

Located downstream from the inlet 3 of the apparatus is a suitable gas moving device, such as a fan 6, which is driven by a fan motor 7. Fan 6 includes a plurality of radially extending blades 8. In this particular embodiment, fan 6 is mounted in the passage of the apparatus by means of struts 9.

Downstream from fan 6 is located a plurality of baffles 13, which may be in the form of vertically oriented angle members having their vertices pointing upstream. In the embodiment illustrated, there are two rows of baffles 13 extending across the housing 2. The baffles 13 of each row are spaced from adjacent baffles in the same row by a distance approximately equal to the width of a baffle and are in alignment with the spaces between the baffles of the other row. Furthermore, the baffles 13 of one row, in the embodiment illustrated the baffles of the upstream row, are adjustable toward and away from the baffles 13 of the other row. As the baffles 13 of the adjustable row get closer to the baffles 13 of the other row, the spaces between them get smaller and pressure drop across the baffle section of the apparatus increases, thereby controlling the flow of gas through the apparatus. Various known mechanical arrangements can be employed to enable the baffles of one row to be adjustable toward and away from the baffles of the other row. As a part of a mechanical arrangement, slots 14 can be provided in a support bar 15 extending across the housing 2.

Immediately adjacent the baffles 13 and located downstream therefrom is a spray chamber which includes in this embodiment an axially extending header 21 connected by means of a supply line 22 to a source of liquid. In an air washer, this liquid may be water having a predetermined temperature. Extending from the header 21 are radial arms 23 having suitable spray nozzles 25 along the length thereof whose function is to spray liquid particles into the gas stream to treat the gas in a manner to be more fully described hereinafter.

On the downstream side of the spray chamber portion of the apparatus is located an eliminator structure 26. Downstream of the spray chamber and just upstream of the eliminator structure 26, a vertical liquid collector 27 is secured to the interior of each of the side walls of the housing 2 to intercept the flow of large amounts of liquid along the side walls and to cause the liquid to drain to the bottom of the housing 2. Each vertical liquid collector 27 is an angle element having one leg extending at a right angle from a side wall of the housing 2 toward the center of the gas stream and another leg projecting upstream from the extending end of the first leg so as to define a channel facing upstream.

Figure 3:
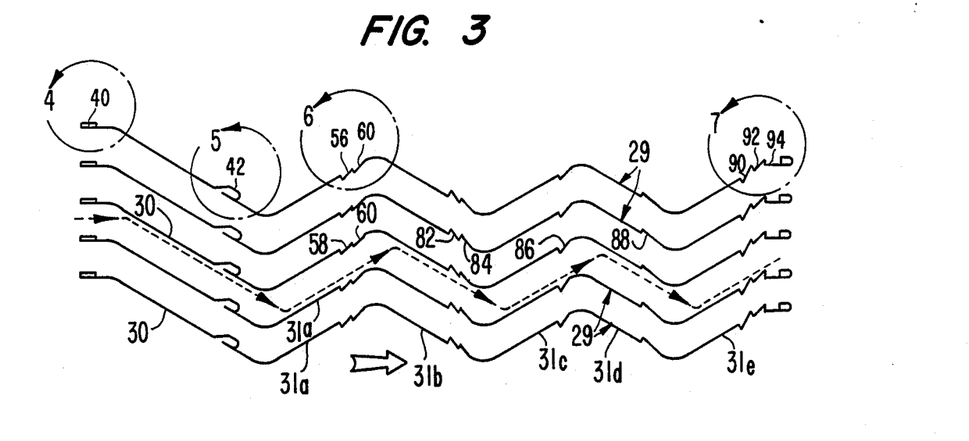
FIG. 3 is an enlarged plan view of a plurality of elements in the eliminator.

As can be seen from FIG. 3, the eliminator structure 26 comprises a plurality of vertically extending blades or elements 29. Each element 29 includes an integral impingement portion, which comprises a vertical planar member 30 secured in the housing 2 at an angle with respect to the gas flow, and a fine eliminator portion, which comprises a plurality of vertical planar members 31a-31e secured in the housing 2 at angles with respect to the gas flow. The leading planar member 31a in the fine eliminator portion with respect to the gas flow is disposed at an angle to the planar member 30 of the impingement portion. Each successive planar member 31b-31e in the fine eliminator portion is disposed at an angle with respect to the preceding planar member 31, so that each element 29 in the eliminator structure 26 defines a zigzag pattern. All of the planar members 30 and 31a-31e in each element 29 are in alignment with corresponding planar members 30 and 31a-31e of adjacent elements 29, in a direction transverse to general direction of gas flow through the housing 2, and are spaced from and parallel to the corresponding planar members, so as to define zigzag paths for the flow of gas through the eliminator structure 26.

The impingement portion intercepts and removes the coarse, or large, particles or drips of liquid from the gas stream, whereas the fine eliminator portion intercepts and removes fine particles or drops of liquid from the gas stream.

Intercepted liquid particles are drained down the slanted bottom portion 34 (FIG. 2) of the housing 2 located underneath the eliminator elements 29. This liquid then passes into the drain through 35 which slants toward and directs liquid into a sump 36 which lies generally at the bottom of the spray chamber. Liquid collected in this sump 36 is passed from the apparatus through a drain (not shown) to suitable conditioning and filtering means.

Figure 4:
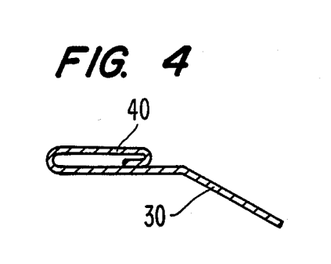
FIG. 4 is a further enlargement of a leading end of one of the elements of FIG. 3.
Figure 5:
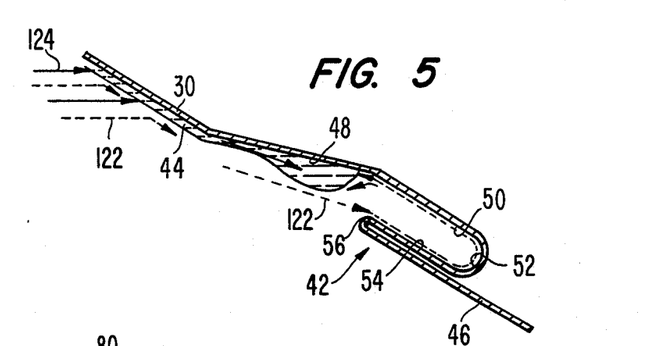
FIG. 5 is a further enlargement of a trailing end of an impingement panel and a transition region from one of the elements of FIG. 3.

As can be seen from FIG. 3 and from FIG. 4, which is a further enlargement of the leading end of one of the elements 29 of FIG. 3, the leading end of each planar member 30 has a bent over tab 40 and, as can best be seen from FIG. 5, near the trailing end of each planar member 30, a vertically extending groove 42 separates a first planar surface 44 of the planar member 30 from a second planar surface 46.

The groove 42 comprises a vertically extending offset portion 48 which is angularly offset from the first planar surface 44. This offset portion 48 continues into a first transition surface 50 which in this embodiment is substantially parallel to the first planar surface 44. The first transition surface 50 terminates in an internal arcuate surface 52 which is vertically disposed and extends a full 180 degrees. In this preferred embodiment, other types of bends can be used as will be evident from the following description of the invention. The arcuate surface 52 continues into a second transition surface 54 which is also parallel to the first planar surface and terminates with a sharp bend 56 and with the beginning of the second planar surface 46, which is in the same plane substantially as the first planar surface 44. This second planar surface 46 extends for a predetermined length which will be described hereinafter.

As can be appreciated from FIG. 3, the zigzag path between each two elements 29 can be considered to include successive legs, a new leg beginning each time the path changes direction. A first leg terminates at the end of the second planar surface 46 and a second leg of the zigzag path is then encountered by the gas stream, whose general flow for one zigzag path is indicated by the dashed line. Because of the bend, the gas stream impinges the first planar member 31a of an element 29 adjacent to element 29 containing the planar member 30 first impinged by the gas stream. Each planar member 31a includes, toward its trailing end, a pair of grooves 58 and 60 to collect a film and/or small particles of liquid still remaining in the gas stream.

Figure 6:
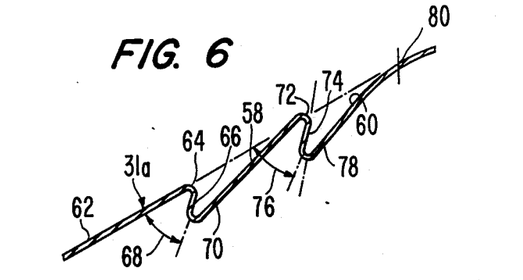
FIG. 6 is a further enlargement of a transition region between two wall portions from one of the elements of FIG. 3.

FIG. 6 is an enlarged view of the grooves 58 and 60. As can be seen, a planar surface 62 of the planar member 31a terminates at a point 64 where the groove 58 begins. A straight portion 66 is formed which makes an acute angle 68 with the planar surface 62. Preferably the angle is less than approximately 90 degrees. Thereafter, the groove 58 is defined by a curved section 70 which terminates at a point 72 which is further noted to be in the plane of surface 62. Also at point 72 the groove 60 begins with a straight surface 74 similar to the straight portion 66 surface. In this case, angle 76 is also acute and should be 90 degrees or less. Groove 60 is then further formed by a curved surface 78 which extends to a point 80 also in the plane of the surface 70.

Thereafter, the zigzag path bends into the third leg wherein the second planar member 31b of the fine eliminator portion of the first element 29 is encountered. Toward the downstream end of the second planar member 31b are another pair of grooves 82 and 84 which are identical to the grooves 58 and 60 in the first planar member 31a, but which project into element 29 from the side opposite to the side into which the grooves in the first planar member 31a project. Thus, the gas stream in a particular zigzag path encounters the grooves 58 and 60 of one eliminator element 29 and the grooves 82 and 84 of an adjacent eliminator element.

As can be seen from FIG. 3, at the trailing ends of the third and fourth planar members 31c and 31d of the fine eliminator section, single grooves 86 and 88, respectively, are defined which are the same in size and configuration as one of the grooves of the pairs of grooves 58 and 60, and 82 and 84 previously described. Furthermore, as can be seen from FIGS. 3 and 7, a single such groove 90 is defined at the trailing end of the fifth planar member 31e and is followed immediately by two more similar grooves 92 and 94 in a portion of the element 29 which makes a transition from the fifth planar member 31e to a tail portion 96 which is parallel to the general flow of gas in the housing 2. The tail portion terminates in a bent over tab 98.

Figure 8:
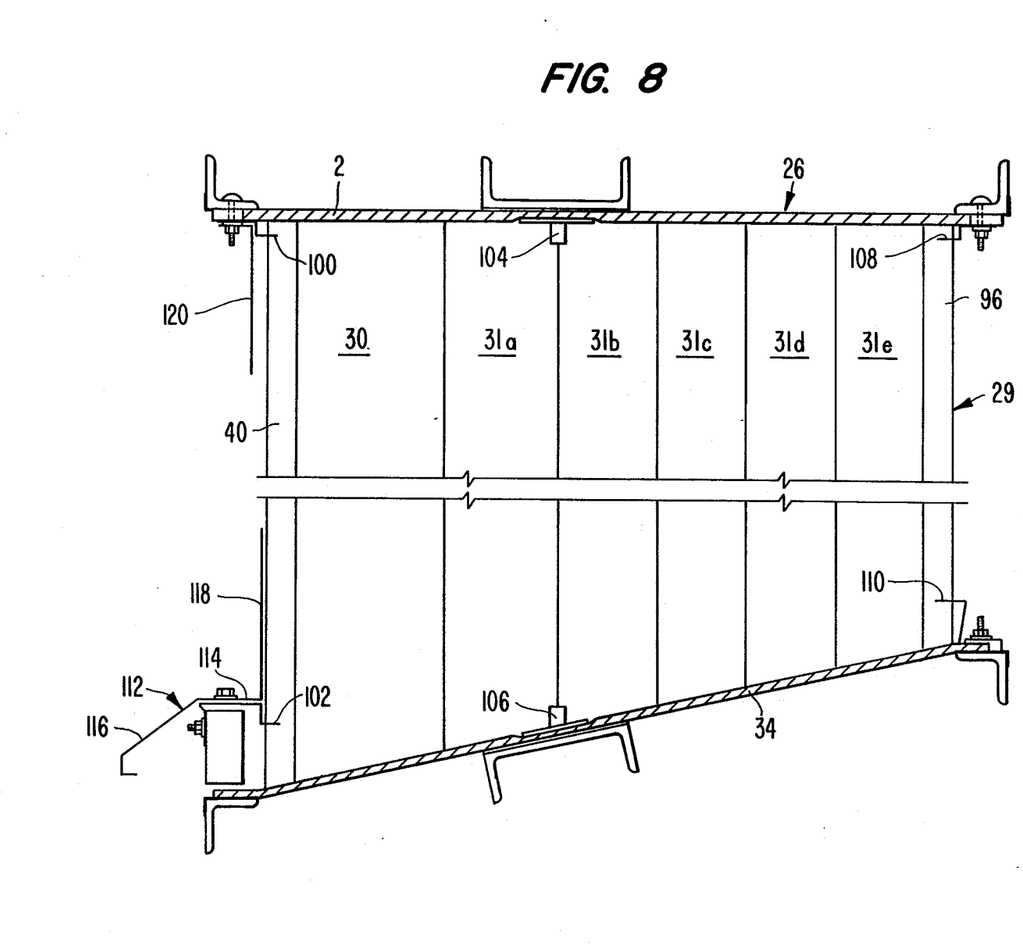
FIG. 8 is an enlarged sectional view in elevation of the eliminator section of the apparatus of FIG. 1.

Considering now FIG. 8, there are shown blade spacer bars 100 and 102 which support the leading edges of the elements 29. Intermediate the ends of the eliminator 26 are spacer clips 104 and 106 which support the elements 29 at the upper and lower portions thereof. Similarly, at the tail portions 96 of the elements 29 are spacer bars 108 and 110.

Another aspect of the invention is a deflector member 112 which in this embodiment is bolted or otherwise suitably attached to the spacer bar 102 so that a portion of the gas stream into the eliminator section is obstructed. The deflector member 112 includes a central portion 114 which is attached to the spacer bar 102, an inclined portion 116 to deflect the gas stream above the bottom of the housing 2, and a vertical portion 118 to direct the gas stream toward the axial center of the housing. The vertical portion 118 comprises a plate projecting above the blade spacer bar 102 at the leading edge of the eliminator elements 29 and extending all the way across the housing 2 in a direction transverse to the gas flow. The deflector member 112 serves to lift a relatively heavily liquid-laden region of the gas stream away from the bottom of the housing 2 and to distribute it over a central area of the housing cross section. The inclined portion also achieves other advantageous effects to be more fully described hereinafter. It is noted that a discrete space is provided between the bottom of the housing 2 and the bottom portion of the deflector member 112. This space is above the sump 36 and, as a consequence, the bottoms of the elements 29 are not submerged in liquid from the sump.

A liquid diverter plate 120 is secured at the top of the housing 2, above the vertical portion 118 of the deflector member 112 where it depends from the top of the housing and extends across the width of the housing. The liquid diverter plate 120 causes liquid in the gas stream at or near the top of the housing 2 to flow down toward the center of the housing where the gas stream enters the eliminator 26.

Considering now the operation of the apparatus described above, the gas, which in the case of an air washer is air, is drawn into the mixing chamber 5 whereupon it is propelled by the fan 6 toward the baffles 13. After passing through the baffles 13, the gas stream will encounter the spray nozzles 25. These spray nozzles 25 pass the spray liquid into the gas stream and, in the case of an air washer, water of a predetermined temperature may be passed into the air stream. As a consequence, the air will not only, if desired, be placed in heat exchange relation with the liquid but also the moisture content of the air stream may be affected. Because of the high velocity of the gas stream, which in this case may have a velocity of 300–2400 feet per minute, it is quite possible that particles of the sprayed liquid may be entrained in the gas stream.

Reference is now made to FIGS. 3–7, which are directed to the details of the eliminator structure. Initially, the gas stream encounters the planar member 30 of the eliminator construction which it is noted is oriented substantially at 45 degrees with respect to the direction of gas flow. For the sake of convenience, since the eliminator comprises a plurality of parallel zigzag paths, only the operation of a single passage will be discussed. The gas stream comprises a gas stream 122 (see FIG. 5) and an entrained liquid particle stream 124. The liquid particles upon impingement on the planar member 30 may form a film of liquid, e.g., approximately one eighth of an inch thick. The gas stream will be deflected by this planar surface with both gas and liquid streams 122 and 124 flowing along the first planar surface 44 with the liquid of the liquid stream 124 forming a film. These streams then encounter the opening in the groove 42 and the liquid film will pass along the offset portion 48. Simultaneously, the gas stream 122 follows the arrow which is indicated as not closely flowing the contour of the groove 42 but rather this gas stream flows adjacent and nearly parallel to the second transition surface 54. Thereafter, a deflecting surface configuration is provided in the form of the bent or arcuate surface which may provide a complete 180 degree turn. It is emphasized that this bend need not necessarily be circular. At this point, the gas stream 122 has been deflected so that its direction has been substantially reversed. The gas stream 122 now follows adjacent the first transition surface 50 which is substantially parallel to the second transition surface 54. In the area adjacent to the offset portion 48, the directional components of the previously described liquid film and the gas stream are in substantially confronting relationship. As a consequence, in the area adjacent the offset portion 48, these two directional components substantially nullify each other because of the geometry of the groove 42, which has been preselected. At this point, by design, the directional components of the gas and liquid streams have been nullified, and only the force of gravity is intended to act on the liquid stream, permitting liquid to flow downwardly due to gravitational forces, to be drained from the groove 42 at the lower portion thereof.

In its broadest aspects, the present invention recognizes that as high velocities are generated in an eliminating structure, it is necessary to nullify and/or isolate various forces which may harmfully affect the collection and drainage of liquid. In this particular invention, there is provided a groove and this groove includes an offset or collecting area in addition to a fluid stream reversal or deflecting means. It will be appreciated that it is intended within the spirit of this invention to utilize the fluid stream reversal means to act upon either or both of the fluid streams. That is, the direction of both the liquid and the gas stream may be altered in a manner so that their directional components when they confront each other will substantially nullify each other in substantially a horizontal plane. In this preferred embodiment it is noted that the gas stream is the fluid stream whose direction has been altered to provide the desired confronting arrangement. It will be appreciated that within the spirit of this invention that either stream (liquid or gas) or both streams could be deflected to provide a situation wherein the fluid streams confront each other and substantially nullify their horizontal directional flow characteristics. It has been found that this groove design is capable of removing 95% of the liquid entrained in the gas stream.

The gas stream, as it enters the second leg of a zigzag path, thereupon encounters the first vertical planar member 31a of the fine eliminator portion whereon the particles may collect and even a small film may form. It has been found that this small film can be substantially removed by the first and second grooves 58 and 60. These grooves 58 and 60 have their above described geometry wherein the grooves drain effectively because the coplanar aspects of surface 62 and points 72 and 80 assure that no low pressure areas will cause flow out of these grooves back into the gas stream.

Figure 7:
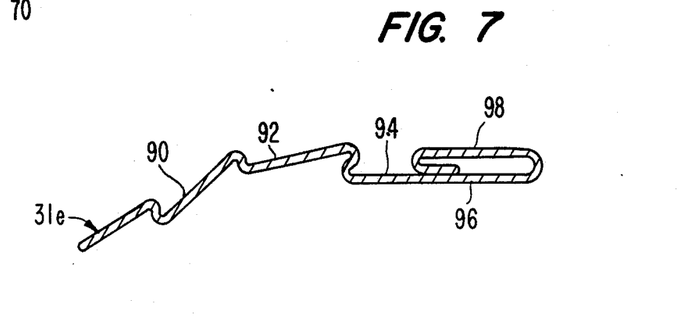
FIG. 7 is a further enlargement of a trailing end of one of the elements of FIG. 3.

Thereafter, the gas stream may encounter the third leg wherein the second vertical planar member 31b may be encountered. The grooves 82 and 84 near the trailing end of the second vertical planar member 31b operate in the same manner as the grooves 58 and 60 in the first vertical planar member 31a. As the gas stream continues through the zigzag path, less and less liquid remains in the gas stream. Therefore, single grooves 86 and 88 at the trailing ends of the third and fourth vertical planar members 31c and 31d are sufficient to permit all of the liquid which impinges on the third and fourth planar members to be separated from the influence of the gas stream and allowed to drain. The single groove 90 at the trailing end of the fifth vertical planar member 31e permits the liquid impinging on that member to drain. The other two grooves 92 and 94, provided on the tail portion 96, help eliminate any liquid which might remain in the gas stream just prior to exiting the eliminator 26. Such liquid usually exists as a very fine mist in the gas stream. Although the fine eliminator section has been described and illustrated herein as having five vertical planar members, it is understood that other numbers of planar members can be employed depending on such factors as the amount of liquid carried by the gas stream, the velocity of the gas stream, and so on.

FIG. 8 shows that when the droplets which have been removed from the gas stream are collected on the eliminator surfaces by the action of gravity, this liquid will pass downwardly toward the inclined bottom wall 34 of the housing 2. Initially, because of the deflector member 112, the gas stream will be restricted at the lower portion of the eliminator and, as a consequence, the lower portion of the elements 29, as well as the lower inclined wall 34, are not subjected to the high velocity of the gas stream which passes along the upper portions of each of the parallel zigzag passages. As a consequence, the liquid as it drains downwardly along the surfaces of the eliminator elements 29 and approaches the bottom of each element will be less affected by the gas stream. This facilitates drainage along surface 34. This also permits the flow of liquid in counter flow direction to the gas stream down the surface 34, passing under the deflector member 112 and into the sump 36 of the apparatus where it may be drained.

The walls of the housing 2 include thermal insulation, such as a rigid foamed insulation like urethane, which can be sprayed between two sheets of material to form the wall. The sheet of material which is to be exposed to the hot gas stream is preferably stainless steel. The outer sheet of material can be stainless steel, or steel coated to resist corrosion, anodized aluminum, or even decorative panels of other material.

Figure 9:
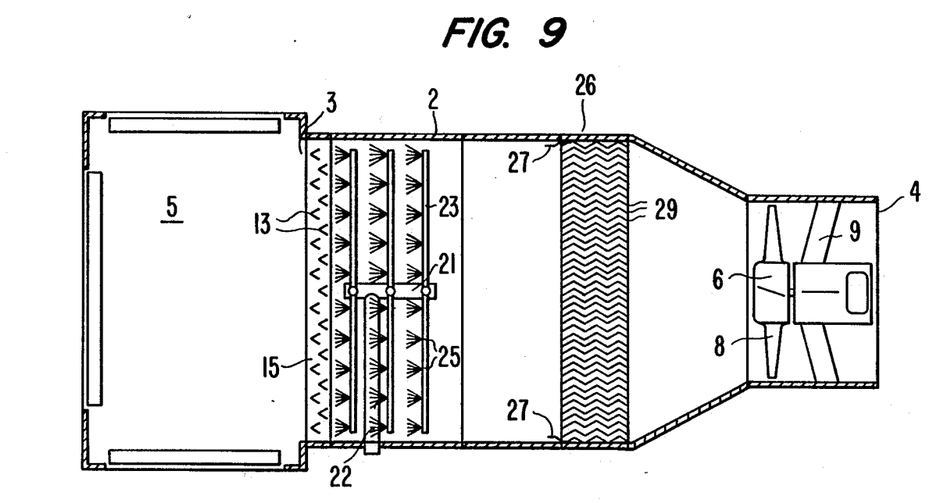
FIG. 9 is a sectional view in plan of another apparatus employing the invention.
Figure 10:
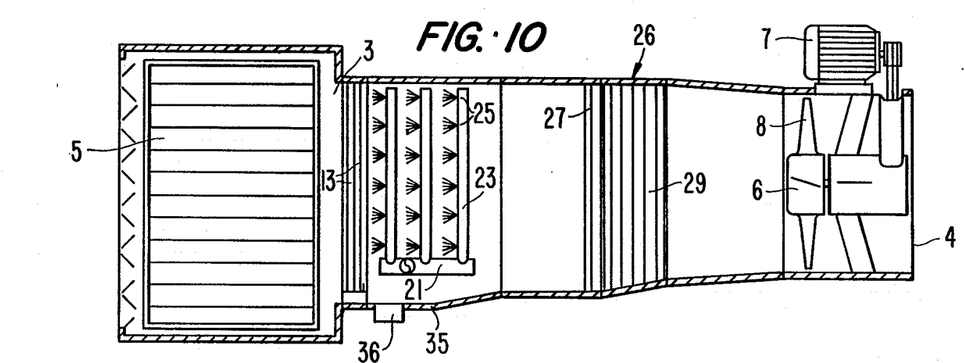
FIG. 10 is a sectional view in elevation of the apparatus of FIG. 9.

FIGS. 9 and 10 illustrate an alternate embodiment of the apparatus according to the present invention in which the fan 6 is mounted downstream of the eliminator section to draw the gas stream through the apparatus, as opposed to the configuration of FIGS. 1 and 2, in which the fan is mounted upstream of the spray section and, thus, blows the gas stream through the apparatus. The various parts of the embodiment of FIGS. 9 and 10 operate the same as the corresponding parts of the embodiment of FIGS. 1 and 2. For example, one row of the baffles 13 of FIGS. 9 and 10 is adjustable toward and away from the other row in order to control gas flow.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

I claim:

1. In an apparatus for treating a gas stream with a liquid, the combination of a housing having side walls and an inlet and an outlet for the gas stream, means for moving the gas stream at a high velocity through the housing generally horizontally from the inlet to the outlet, means for placing substantial quantities of liquid into intimate contact with the gas stream to condition the gas stream, and an eliminator for removing liquid particles from the gas stream, the improvement comprising means in the housing upstream of the eliminator for removing from the gas stream large quantities of the liquid which travel along the side walls of the housing, said liquid removing means comprising substantially vertical elements projecting from the side walls of the housing toward the center of the gas stream, said vertical elements being positioned upstream of and adjacent to the eliminator.

2. The apparatus according to claim 1, wherein said vertical elements comprise angle members each including a first leg having an end projecting from its associated side wall of the housing toward the center of the gas stream and a second leg extending upstream from the projecting end of the first leg, each angle member defining with its associated side wall a channel facing upstream.

3. The apparatus according to claim 1, wherein the housing includes a top wall and a bottom wall, and large quantities of the liquid travel in portions of the gas stream along the top and bottom walls, the improvement further comprising means for deflecting the portions of the gas stream travelling along the top and bottom walls toward the cross sectional center of the housing, said deflecting means comprising a first plate depending from the top wall of the housing and a second plate projecting up from adjacent to the bottom wall of the housing.

4. The apparatus according to claim 3, wherein the second plate comprises an inclined portion extending from adjacent the bottom of the housing at an angle toward the eliminator and toward the top wall of the housing.

5. The apparatus according to claim 1, further comprising a baffle section positioned in said housing upstream of said means for placing substantial quantities of liquid into intimate contact with the gas stream, said baffle section comprising a plurality of rows of spaced parallel elongate baffle elements extending transverse to the gas stream, the baffle elements of at least one row being in alignment, with respect to the gas stream, with the spaces between baffle elements of at least one adjacent row.

6. The apparatus according to claim 5, further comprising means for adjusting the baffle elements of at least one row toward and away from an adjacent row of baffle elements.

7. The apparatus according to claim 5, wherein the baffle elements comprise angle members having vertices pointing upstream.

8. The apparatus according to claim 1, wherein the walls of the housing comprise foam thermal insulation between two sheets of other material.

9. In an apparatus for treating a gas stream with a liquid, the combination of means for moving the gas stream at a high velocity, means for placing substantial quantities of liquid into intimate contact with the gas stream to condition the gas stream, and an eliminator for removing liquid particles from the gas stream, said eliminator comprising a plurality of substantially vertical blades parallel to and spaced from one another, each of said blades including a planar impingement member angularly disposed with respect to the gas stream and a plurality of fine eliminator planar members including a first planar member angularly disposed with respect to said planar impingement member and to said gas stream and successive planar members, each successive planar member angularly disposed with respect to the preceding planar member and to said gas stream, whereby a plurality of zigzag paths are defined through said eliminator, wherein said gas stream includes a gas portion and a liquid portion flowing through said eliminator, and said planar impingement member has a substantially vertical groove defining means for deflecting the gas portion and the liquid portion of the gas stream into substantially confronting arrangement to substantially nullify flow components of the gas portion and the liquid portion of the gas stream, each of said fine eliminator planar members has a surface and at least one vertical groove in the fine eliminator planar member, each said groove being defined by a straight portion of the planar member, which is at an acute angle with the surface, and a second portion of the planar member, which forms an angle with the straight portion so as to extend to and substantially terminate at the planar portion of the surface of the planar member, the groove in each of said fine eliminator planar members is adjacent to the trailing edge, with respect to the movement of the gas stream, of its planar member, said first planar member of said fine eliminator planar members has two of said vertical grooves next to one another, and the fine eliminator planar member successive to said first planar member has two of said vertical grooves next to one another.

10. The apparatus according to claim 9, wherein each of said vertical blades of the eliminator includes a tail portion disposed parallel to the gas stream and at an angle with respect to the farthest downstream of the fine eliminator planar members of the vertical blade, said tail portion including a surface and at least one vertical groove formed by a straight portion which is at an acute angle with the surface and second portion which forms an angle with the straight portion so as to extend to and substantially terminate at the surface.

11. The apparatus according to claim 9, wherein the planar impingement member and the fine eliminator planar members of each blade are integral with one another.

12. The apparatus according to claim 9, wherein each of said blades has a first side and an opposite second side, the groove in the planar impingement member being formed in the first side of the blade and the groove in the first planar member of the find eliminator planar members being formed in the second side of the blade, the grooves in successive planar members being formed in alternate sides of the blade.

* * * * *